United States Patent [19]
Hettich

[11] 3,908,053
[45] Sept. 23, 1975

[54] FINISHED PARQUET ELEMENT

[76] Inventor: Karl Hettich, Schloss Str. 22, D 7554 Kuppenheim, Germany

[22] Filed: Apr. 11, 1973

[21] Appl. No.: 350,299

[30] Foreign Application Priority Data
Aug. 7, 1972 Germany............................ 2238830
May 18, 1972 Germany..................... 7218713[U]

[52] U.S. Cl. .................... 428/44; 428/58; 428/156; 428/167; 52/387; 52/390
[51] Int. Cl.² ........................ B32B 3/10; B32B 3/14
[58] Field of Search .......... 161/36, 37, 123; 52/384, 52/385, 386, 387, 388, 389, 390

[56] References Cited
UNITED STATES PATENTS

| | | | |
|---|---|---|---|
| 1,398,698 | 11/1921 | Lancaster | 52/390 |
| 1,661,037 | 2/1928 | Gammeter | 52/390 |
| 2,018,711 | 10/1935 | Elmendorf | 52/390 |
| 2,088,238 | 7/1937 | Greenway | 52/390 |
| 2,123,409 | 7/1938 | Elmendorf | 52/390 |
| 3,014,829 | 12/1961 | Curtin | 161/406 |
| 3,166,455 | 1/1965 | Levitch | 161/38 X |
| 3,365,850 | 1/1968 | Marino | 161/36 |
| 3,535,839 | 10/1970 | Strubing | 52/390 |
| 3,579,410 | 5/1971 | Barrett | 161/36 X |
| 3,579,941 | 5/1971 | Tibbals | 52/384 |

OTHER PUBLICATIONS
Ratjen, German Application 1,509,793, Printed 6-12-69, (K1.37d15/04), 6 pages spec., 1 sheet drawing.

Primary Examiner—Mayer Weinblatt
Assistant Examiner—Edith R. Buffalow
Attorney, Agent, or Firm—Allison C. Collard

[57] ABSTRACT

A finished parquet element for attaching to a surface having a plurality of members bonded in one layer so as to be thin in relation to the element's length and width. The element is coated with a sealant. Interconnecting means are disposed on opposite edges of the element. To increase the element's flexibility grooves are cut along the underside of the members. The elements come equipped with fastening means disposed along the underside of the members for securing the element to the surface. In one embodiment, an elastic foundation is attached to the member's underside to increase its shock resistance.

3 Claims, 12 Drawing Figures

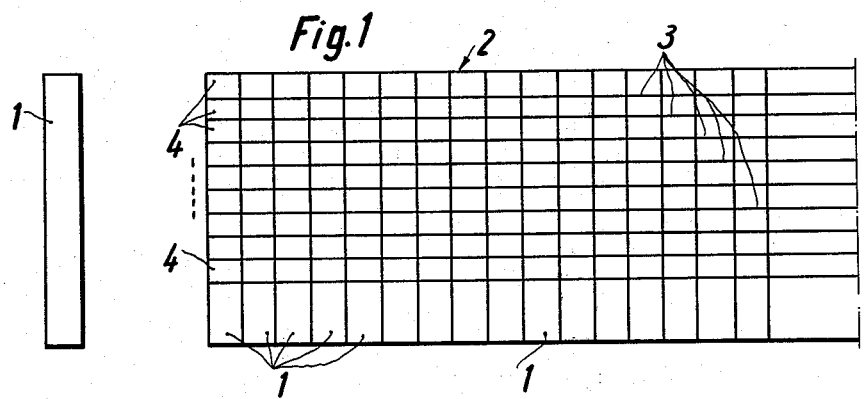
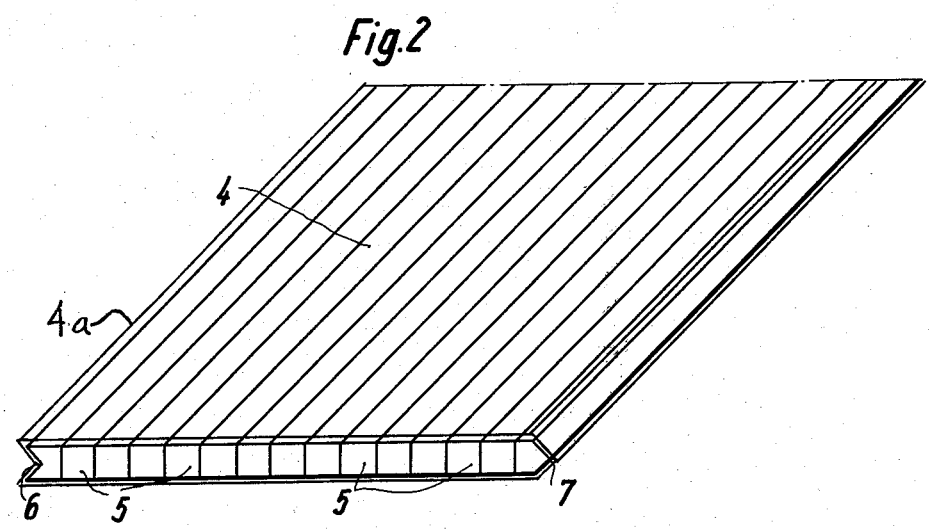
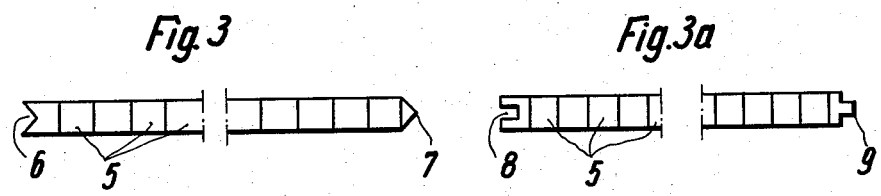

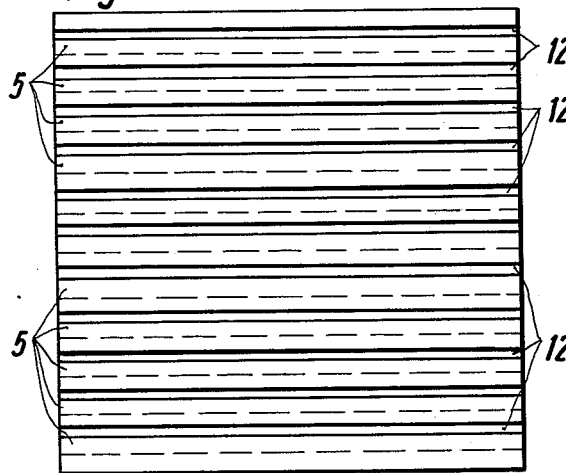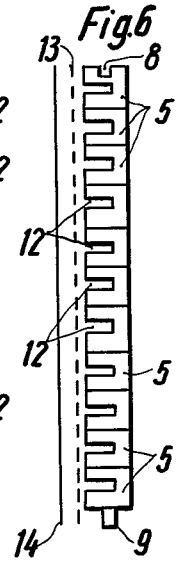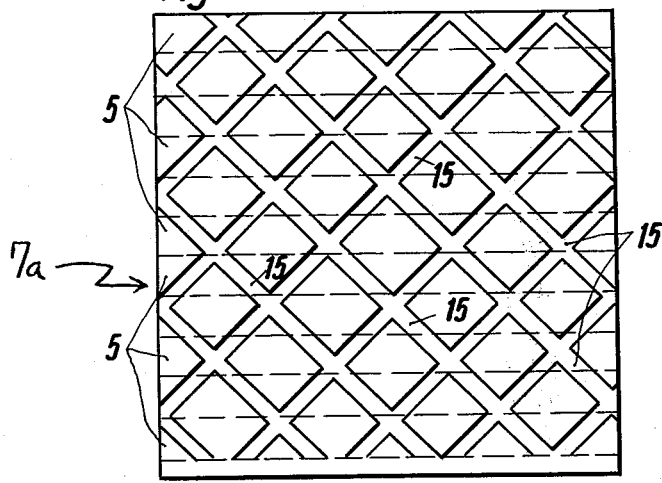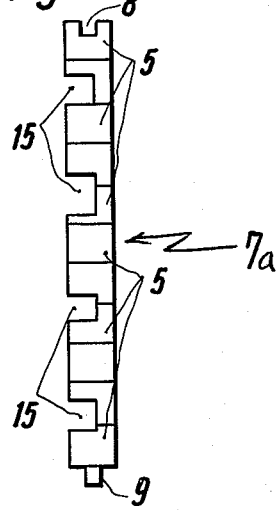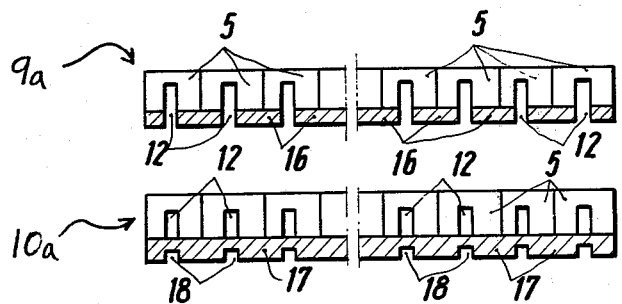

FINISHED PARQUET ELEMENT

This invention relates to a parquet element. More particularly the present invention relates to an inexpensively constructed finished parquet element that may be immediately laid onto a base plaster floor.

Many finished parquet elements are known which shorten the time and labor required in laying the parquet floor. These prior art parquet elements generally comprise the so-called block construction. Block constructed finished parquet elements include multi-layered bonded elements. This multi-layered bonded arrangement achieves a certain inherent stability. However, it is required that these finished parquet elements be rigid in all directions despite variations in wood properties. In addition, the parquets are usually laid so as to float on a bed of cement. It is apparent that these finished parquet elements, when compared to mosaic parquets, are expensive and are time consuming to manufacture. Furthermore, it is difficult to lay this inherently stiff block construction, making this type of parquet floor expensive.

Other types of finished parquet elements are known that are more suitable for modern construction. These finished parquet elements may be laid directly on the plastered floor. They comprise wide laminas that are held together by wires. The wires are pressed into grooves on the underside of the parquet elements. The longitudinal sides of the finished parquet elements comprise grooves and ridges, while the lateral sides are even. These finished parquet elements are preferred over the aforementioned block construction. However, they are also expensive to make and do not adjust to any unevenness in the floor base. Another drawback associated with wide laminas is the danger of "locking". That is, the laminas tend to buckle owing to floor dampness.

Accordingly, in the inventive apparatus the finished parquet element comprises one layer of wood that is relatively thin and very flexible. In accordance with the preferred embodiment of the invention, the finished parquet element comprises a single layer of a plurality of relatively small wooden bars or wooden ribs that are flexibly connected by an elastic glue or plastic bond.

The finished parquet element of the present invention is particularly desirable because added flexibility allows it to readily adjust to any unevenness in the floor base. Inherent stability is not required, since this stability already exists in the floor base. Employing relatively small wooden elements prevents the above-mentioned "locking" without need for special measures. Furthermore, in accordance with the invention, the finished parquet elements are presealed thereby protecting these elements from dampness before and after installation. The inventive finished parquet element may be made in any dimension.

To allow easy placement, a groove is disposed on all sides of the finished parquet element. Consequently, during installation side-by-side connection of the elements is assured. This eliminates the need for exposing interconnecting projecting teeth while the elements are laid.

In accordance with another embodiment of the present invention, a special two-sided bonding mat is utilized to facilitate laying the finished elements. This bonding mat may be supplied with a protective foil on both sides. The protective foil is removed during the installation of the finished parquet elements. The bonding mat is mounted on the base floor, and by eliminating any sliding of the elements it assures a clean and fast installation.

In order to insure element flexibility grooves may be provided on the undersides of the elements. These grooves may be disposed, for example, longitudinally, vertically or oblique with respect to the plurality of wooden bars. An elastic foundation may be mounted on the backs of the finished parquet elements. This foundation may comprise, for example, a shock absorbing plate that is bonded to the elements. The shock plate may also be equipped with grooves to increase its flexibility.

It is therefore an object according to the present invention to provide a finished parquet element overcoming the aforementioned disadvantages of the prior art.

It is a further object of the present invention to provide finished parquet elements that are thin, flexible, easy to manufacture and adaptable to immediate installation.

Other objects and features of the present invention will become apparent from the following detailed description considered in connection with the accompanying drawings which show preferred embodiments of the invention. It is to be understood however that the drawings are designed for the purposes of illustration only and not as a definition of the limits of the invention.

In the drawings wherein similar reference characters denote similar elements throughout the several views:

FIG. 1 is a side view of a block of glued and assembled individual wooden bars used in manufacturing the finished parquet elements;

FIG. 2 is a perspective view of a secton of the finished parquet elements according to the invention made from cutting the block of FIG. 1;

FIG. 3 is a side view of the parquet element of FIG. 2;

FIG. 3a is a side view of another embodiment of the present invention;

FIG. 5 is a further embodiment of the finished parquet element according to the invention showing grooves used to increase flexibility;

FIG. 6 is a side view of the embodiment of FIG. 5;

FIG. 7 is yet another embodiment of the finished parquet element according to the invention and seen from below;

FIG. 8 is a side view of the embodiment of FIG. 7;

FIG. 9 is a side view in section of still another embodiment of the finished parquet element according to the invention;

FIG. 10 is yet a different embodiment of the present invention; and

Figure 4:
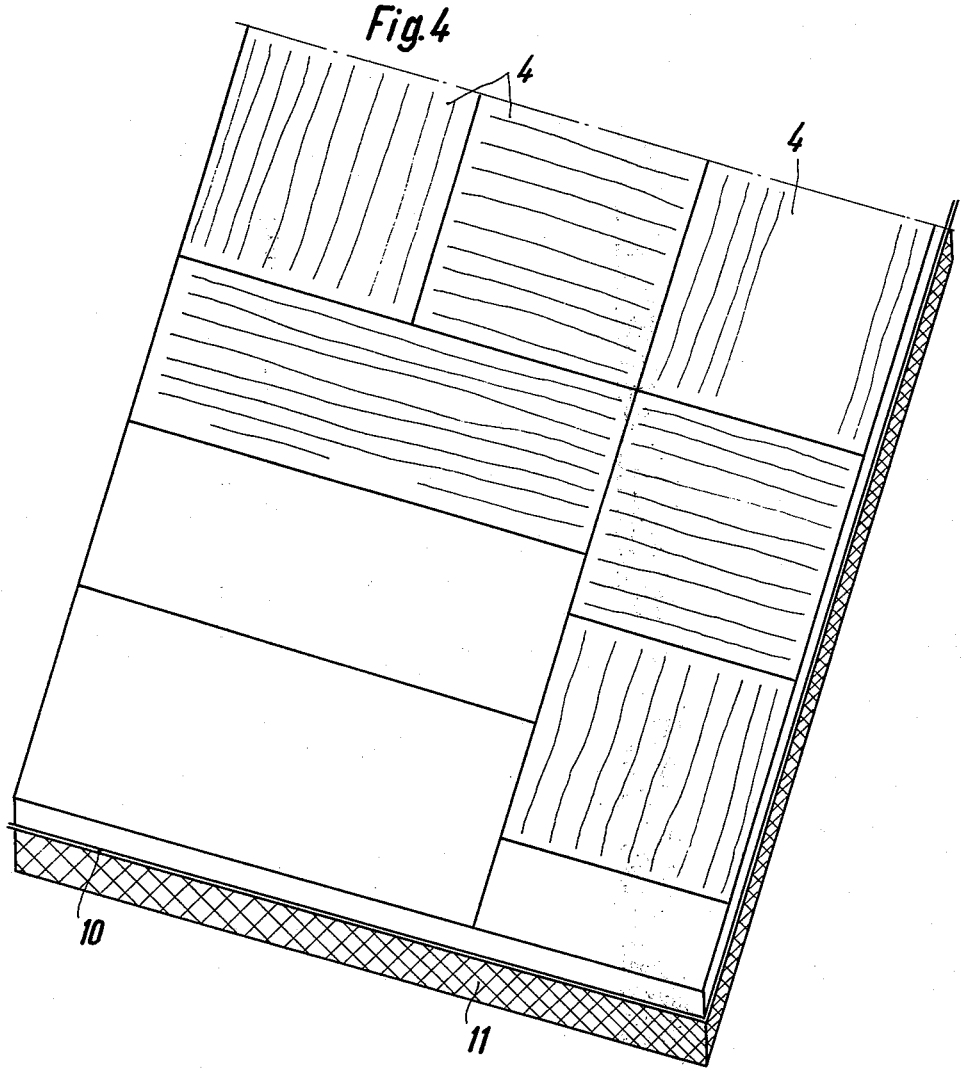
FIG. 4 shows laying the inventive finished parquet elements onto the base floor and employing the inventive double bonded mat.

Referring now to FIG. 1 there is shown the manufacture of a finished parquet element according to the present invention. A plurality of individual wooden bars or ribs 1 are formed into a block 2 by employing an elastic glue or plastic bonding (not shown). Block 2 is then cut along the lines indicated by numeral 3, thus forming individual parquet elements 4.

Referring now to FIG. 2, each parquet element 4 is composed of individual bars or ribs 5. Due to its unique construction the finished parquet element is flexible and can readily adjust to unevenness in the base floor. In order to keep moisture from entering the finished parquet element, the element has a sealing or coating 4a that may be any suitable sealant.

As shown in FIGS. 2 and 3 an angle-like groove 6 is provided at one edge of the parquet element 4 while the opposite edge is provided with a complementary wedge-shaped portion 7. Installation merely requires engaging the groove 6 of one finished parquet to the wedge-shaped portion of an adjacent element (not shown). This construction avoids the need for projecting teeth when interconnecting the individual elements. As seen in FIG. 3a this groove and wedge-shaped formation may also comprise a groove 8 and a tongue 9 for engaging adjacent parquet element grooves.

Referring now to FIG. 4 there is shown a plurality of assembled finished parquet elements 4 according to the invention. The finished parquet elements are mounted on a mat 10. Mat 10 includes a bonding agent (not shown) on both faces. Mat 10 is then mounted onto a base floor 11. If the bonding agent is pressure-sensitive, mat 10 may be provided with a protective foil that is removed just prior to installation. Bonding mat 10 sticks without sliding on the base floor, allowing fast and clean laying of the flexible finished parquets. The inventive finished parquets may be made in any desired dimension. It is therefore possible to make square or rectangular elements comprising one layer.

In the embodiments of the invention of FIGS. 5 and 6 a square-shaped finished parquet is shown. A plurality of longitudinal grooves 12 are provided on the underside of wooden bars 5 to increase flexibility. The undersides are then covered with a suitable bonding agent 13 (shown in dash-dot lines). A protective foil 14 may be placed on agent 13 as shown. If desired, it is also possible to apply bonding agent 13 to the parquet element just prior to installation and then conform it to the base floor.

Referring now to FIGS. 7 and 8 another embodiment of the inventive apparatus is shown. A plurality of grooves 15 are disposed on the under side of a parquet element 7a. Grooves 15 increase the flexibility of element 7a. Element 7a comprises the wooden bars 5 and an engaging tongue 9 disposed along one edge. A complementary receiving slot 8 is disposed along an opposite edge of element 7a as seen in FIG. 8. A bonding element (not shown) may be applied to the underside of element 7a to facilitate installation.

FIG. 9 is a further embodiment of a finished parquet element 9a according to the invention. In this embodiment an elastic foundation 16 is mounted on the underside of parquet element 9a. The foundation 16 may be a shock absorbing plate. The shock plate may comprise hard fiber material, bitumen material, cork material or foam rubber. After plate 16 is attached to parquet element 9a, either the narrow grooves 12 (of FIGS. 5 and 6) or the wide grooves 15 (of FIGS. 7 and 8) are cut into the undersides as shown. Consequently, the shock absorbing segments 16 remain attached to the under side of parquet elements 9a.

Referring now to FIG. 10 a shock absorbing plate 17 is bonded to a parquet element 10a. Either the grooves 12 (of FIGS. 5 and 6) or the grooves 15 (of FIGS. 7 and 8) are cut into the undersides of parquet elements 10a. The shock absorbing plate 17 is then mounted to the undersides and a plurality of grooves 18 are cut into the exposed face of plate 17 as shown.

Figure 11:
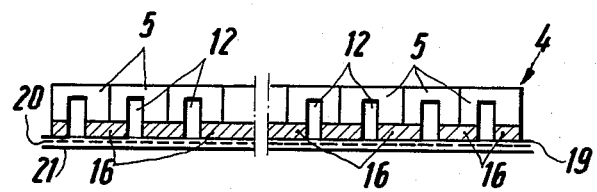
FIG. 11 is one more embodiment of the parquet element according to the invention in a sectional side view.

A still further embodiment is seen in FIG. 11. A bonding foil 19 is mounted across the segments 16. Segments 16 (from the embodiment of FIG. 9) comprise the shock-absorbing plate. Attached to foil 19 is a bonding agent 20 that is protected by a detachable cover foil 21. When installing and laying the parquet element, the cover plate or foil 21 is removed and the element can be immediately placed onto the base floor.

While only some embodiments of the present invention have been shown and described, it will be apparent to those skilled in the art that many changes and modifications may be made thereto without departing from the spirit and scope of the invention.

What is claimed is:

1. A ready made parquet element comprising a top portion of a substantially rectangular plate made of a plurality of small wooden boards flexibly interconnected by means of a bonding the material to form a single layer of wood;

a bottom portion of a shock plate bonded on the bottom side of said layer of wood to serve as an insulating plate;

a plurality of grooves formed in said shock plate and through a portion of the bottom surface of said single layer of wood, thereby lending to the element sufficient flexibility so that it conforms to the unevenness of a base floor on which the element is placed and secured with a bonding material, thereby providing a seal for the element from all sides, and, a plurality of tongues and slots formed along the edges of said layer of wood to permit interengagement of adjacent parquet elements.

2. The parquet element as defined in claim 1, wherein said bonding material is in the form of a bonding foil on at least one of said bottom side and said insulating plate so that said bonding material is covered with a peelable foil.

3. The parquet element as defined in claim 1, wherein said grooves are provided in a diagonal direction.

* * * * *